United States Patent [19]
Predetechensky

[11] Patent Number: 5,876,615
[45] Date of Patent: Mar. 2, 1999

[54] MOLTEN SOLDER DROP EJECTOR

[75] Inventor: Mikhail Predetechensky, Novosibirsk, Russian Federation

[73] Assignee: Hewlett-Packard Company, Palo Alto, Calif.

[21] Appl. No.: 778,085

[22] Filed: Jan. 2, 1997

[51] Int. Cl.$^6$ ........................................................ B05B 1/08
[52] U.S. Cl. ........................... 222/590; 222/594; 266/237
[58] Field of Search ................................... 222/590, 591, 222/593, 594; 266/236, 45, 237

[56] References Cited

U.S. PATENT DOCUMENTS

| | | | |
|---|---|---|---|
| 3,647,137 | 3/1972 | Naydan | 239/102 |
| 4,380,786 | 4/1983 | Kelly | 361/228 |
| 4,828,886 | 5/1989 | Heiber | 427/422 |
| 4,962,885 | 10/1990 | Coffee | 239/3 |
| 5,229,016 | 7/1993 | Hayes et al. | 222/590 |
| 5,337,963 | 8/1994 | Noakes | 239/600 |
| 5,377,902 | 1/1995 | Hayes | 222/590 |
| 5,377,961 | 1/1995 | Smith et al. | 266/237 |
| 5,415,679 | 5/1995 | Wallace | 222/593 |
| 5,560,543 | 10/1996 | Smith et al. | 239/102.2 |

FOREIGN PATENT DOCUMENTS

| | | |
|---|---|---|
| 0491599A1 | 12/1991 | European Pat. Off. . |
| 2322544B2 | 5/1973 | Germany . |
| 4002786A1 | 1/1990 | Germany . |
| 4230336A1 | 9/1992 | Germany . |
| 4405082A1 | 2/1994 | Germany . |

*Primary Examiner*—Scott Kastler

[57] ABSTRACT

A simple yet highly reliable technique for ejecting a droplet of heated solder, or other liquid conductive material, is described. Small droplets of an electrically-conductive liquid are ejected on-demand from a drop generator operating on a magnetohydrodynamic principle. The drop generator consists of two substantially parallel conductive paths separated by a thin electrically-insulating material. A channel for the conductive liquid contains a drop ejecting orifice, and the conductive liquid in the channel forms a first of these two parallel conductive paths. The other path is either a solid conductor or a second channel filled with the conductive liquid. A current on the order of 10–1000 amperes is pulsed through the two parallel conductive paths, and the interaction of the magnetic fields generated by the electric currents through the parallel paths with these currents forces a droplet of the conductive liquid through the orifice in the first channel. By adjusting the duration and/or magnitude of the pulsed current, the droplet size may be carefully controlled. In the preferred embodiment, the drop generator is in the form of a self-contained replaceable cartridge.

25 Claims, 6 Drawing Sheets

MOLTEN SOLDER DROP EJECTOR

TECHNICAL FIELD

This invention relates to drop generators which eject liquid metal drops.

BACKGROUND ART

Devices for providing controlled sizes of liquid metal drops are used to create both electrical connections as well as mechanical connections between two pieces. For example, it is known to form solder bumps on a surface of an integrated circuit, where the solder bumps are eventually contacted by wires or contact pads from a second body to provide electrical and mechanical connections to the integrated circuit. The liquid drops of solder may also be used to form conductive traces, other conductive patterns, and mechanical structures. Typically, these solder bumps are 50–200 microns high.

The solder is usually heated to be in a molten state and, after ejection, freezes when it comes in contact with the workpiece. In most cases, the now solid solder drops are again melted for fusing the solder to a wire, a contact pad, or any other part.

The liquid metal is typically a tin-lead solder, but other metals and alloys commonly used for solders, such as gold, silver, and copper alloys, are also used.

Typical drop generators consist of a small tank filled with a liquid material, such as heated solder, which is connected to a pump. The pump forces the liquid metal through an orifice so that a certain size drop of metal is ejected from the orifice. Droplets, as opposed to a steady stream of the liquid metal, are created by either capillary-wave instability of the stream or a controlled pulsing of the liquid stream. One type of pump used to eject drops from the orifice is a piezoelectric plate which mechanically applies pressure to the tank upon a voltage applied to the piezoelectric plate. A single drop would then be ejected for each voltage pulse applied to the piezoelectric transducer.

The output orifice is typically non-wettable and small enough such that the liquid metal in the tank does not leak from the orifice without pressure applied by the pump.

The known drop generators have deficiencies because of either a complex construction or fluctuations in the size of an emitted droplet. For example, the performance of the piezoelectric transducer is highly dependent upon temperature conditions, such that variations in temperatures will vary the droplet size. Also, piezoelectric transducers can operate only below their Curie Point, which, for present materials, limits their use to metals with melting points below about 300° C. Construction of piezoelectric force generators typically requires an adhesive to couple the force generator to a deformable element. Long-term mechanical stability of this adhesive bond is a significant design hurdle for these devices. Temperature, cycle-life, bulk modulus stability, and other sensitivities add unreliability to such systems.

Additionally, some known drop generators require pressure regulators, filters, complex liquid metal plumbing, dissolved gas monitoring, and other requirements which add bulk, expense, and complexity to the liquid metal droplet delivery system.

What is needed is an improved drop generator for liquid metal, such as heated solder, which is simpler, less costly, and potentially smaller than existing designs and which ejects droplets having a more controllable size.

DISCLOSURE OF INVENTION

A simple yet highly reliable technique for ejecting a droplet of heated solder, or other liquid conductive material (even non-metals), is described. Small droplets of an electrically-conductive liquid are ejected on-demand from a drop generator operating on a magnetohydrodynamic principle. The drop generator consists of two substantially parallel conductive paths separated by a thin electrically-insulating material. A channel for the conductive liquid contains a drop ejecting orifice, and the conductive liquid in the channel forms a first of these two parallel conductive paths. The other path is either a solid conductor or a second channel filled with the conductive liquid. In the latter case, this second channel may be a folded back extension of the first channel.

A current on the order of 10–1000 amperes is pulsed through the two parallel conductive paths, and the interaction of the magnetic fields generated by the currents through the parallel paths forces a droplet of the conductive liquid through the orifice in the first channel. If the second path is located behind the first channel with the orifice in front of the first channel, the directions of the current through the two parallel conductive paths are opposite so that a repulsive force is produced between the two paths to eject a droplet. If the second path is located in front of the orifice with the first channel on the other side of the orifice, then the directions of the current through the two paths are the same so that an attracting force is produced to eject a droplet.

By adjusting the duration and/or magnitude of the pulsed current, the droplet size may be carefully controlled.

In the preferred embodiment, the drop generator is in the form of a self-contained replaceable cartridge.

BEST MODE FOR CARRYING OUT THE INVENTION

Figure 1:
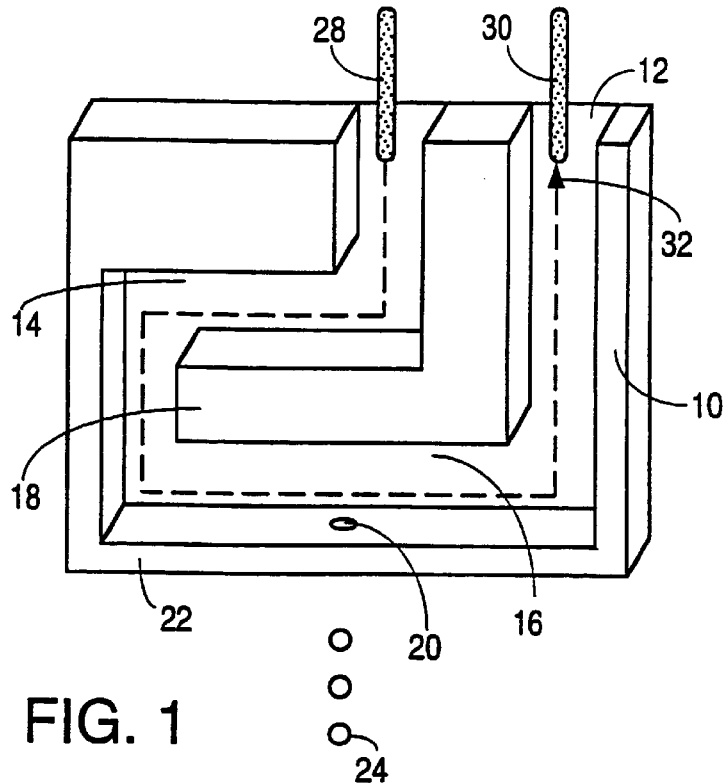
FIG. 1 in a front perspective view of the ejector portion of a preferred embodiment drop generator, with its front panel removed, using the liquid metal as the sole conductor of electricity.

FIG. 1 is a perspective view of the ejector portion of a metal drop ejector, with its front panel removed, in accordance with one embodiment of the invention. In FIG. 1, chamber walls 10 define a continuous channel 12 in which a liquid metal resides. Chamber walls 10 are formed of a dielectric material, such as a ceramic material assembled and sealed with glaze (melted glass). Channel 12 has a back channel portion 14 and a front channel portion 16 separated by an electrically insulating chamber wall 18.

An orifice 20 is formed in a front chamber wall 22, where the axis of orifice 20 is substantially perpendicular to channel portions 14 and 16. Orifice 20 may be a commercially available sapphire nozzle. A droplet 24 of liquid metal will be ejected from orifice 20 as described below.

During operation, the liquid metal resides in channel 12 and is in contact with electrode 28 at one end of channel 12 and in contact with electrode 30 at the other end of channel 12. It is assumed that the liquid metal is a good conductor of electricity, such as a tin-lead solder or other alloy or metal. When a voltage is applied between electrodes 28 and 30, a current flows from electrode 28, through the liquid metal, to electrode 30. The direction of current is shown by arrow 32, but the direction of current can also be opposite to that shown.

The flow of current through back channel portion 14 is in a direction opposite to the flow of current through front channel portion 16. Thus, the magnetic field created by the current through the liquid metal in back channel portion 14 repels the liquid metal in front channel portion 16. This repulsion acts as a pump to force a droplet 24 of liquid metal from orifice 20. Pulsed current through the liquid metal will produce droplets 24 of a selectable size based upon the magnitude and/or duration of the current pulse. If the voltage applied to electrodes 28 and 30 were continuous, a stream of liquid metal may be ejected from orifice 20.

The repelling force varies as the inverse of the physical separation of the conductive paths, so wall 18 should be made as thin as possible. The force also varies directly as the product of the currents in the channel portions 14 and 16.

In the preferred embodiment, orifice 20 is at a lower elevation than the liquid metal to ensure a supply of liquid metal in front channel portion 16. Orifice 20 is non-wettable so that the surface tension of the liquid metal prevents the liquid metal from drooling through orifice 20 from a static positive pressure produced by gravitational forces.

Since the current pulse through the liquid metal as well as the temperature of the liquid metal can be precisely controlled, the drop size and frequency of ejection may be carefully controlled.

A more complete embodiment will be described later with respect to FIGS. 9 and 10.

Figure 2:
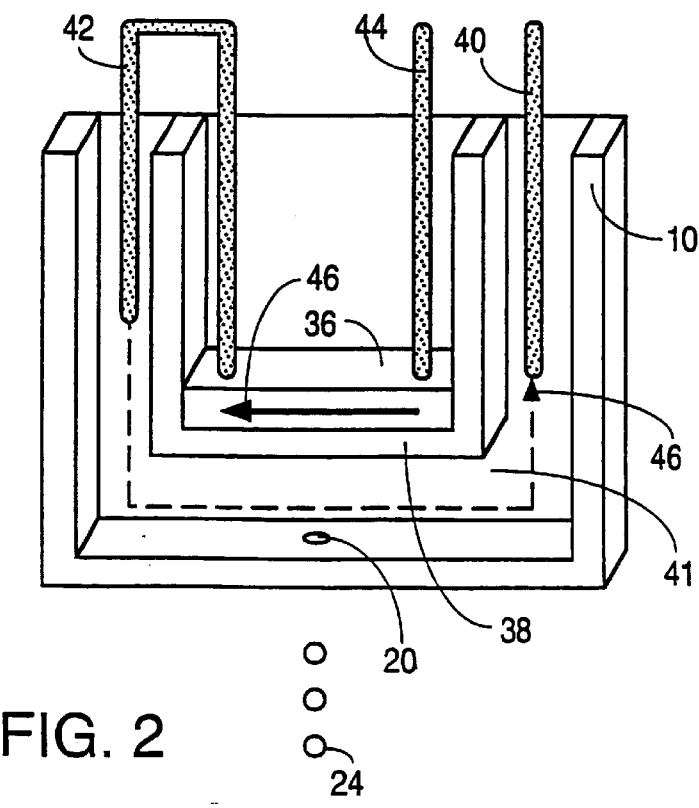
FIG. 2 is a front perspective view of an alternative embodiment of the ejector portion, with its front panel removed, using both a solid conductor and the liquid metal as electrical conductors.

FIG. 2 illustrates another embodiment of the invention using the basic principles described with respect to FIG. 1. In FIG. 2, instead of current flowing through the liquid metal in a back channel portion, the current flows through a fixed conductor 36 insulated from the liquid metal by an insulating wall 38.

A first electrode 40, coupled to a power supply, is in electrical contact with the liquid metal at one end of a front channel portion 41. A second electrode 42 creates a conductive path from the liquid metal to one end of conductor 36. A third electrode 44 connects the other end of conductor 36 to the power supply. The direction of current is illustrated by arrows 46 and may also be in an opposite direction. The current through fixed conductor 36 is in a direction opposite to the current through the liquid metal in the vicinity of orifice 20 such that the magnetic field generated by the current through conductor 36 repels the liquid metal in the vicinity of orifice 20 to force a droplet 24 (or a stream) of liquid metal through orifice 20.

As described with respect to FIG. 1, by controlling the duration and/or magnitude of the electric current pulse through the liquid metal and conductor 36, the size of droplet 24 or any liquid stream is controllable and easily reproducible.

Figure 3:
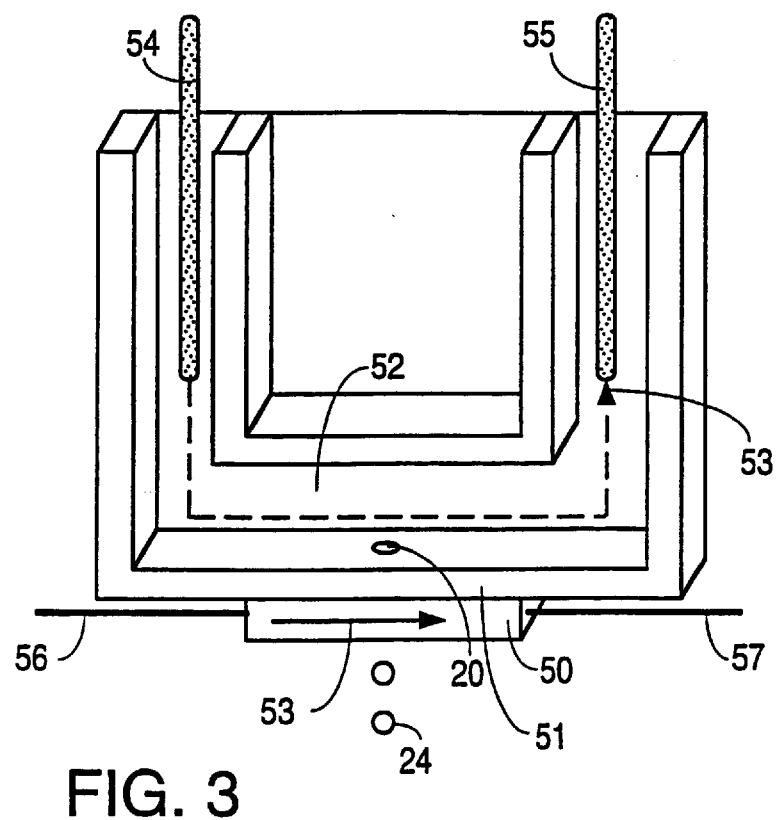
FIG. 3 is a front perspective view of a third embodiment of the ejector portion, with its front panel removed, using a solid conductor located on the outer wall of the tank containing the liquid metal.

FIG. 3 illustrates another embodiment of the invention also using the basic principles described with respect to FIG. 1. In FIG. 3, a fixed conductor 50 is located outside of the chamber wall 51 and surrounds orifice 20. By running a current through the liquid metal in channel 52 in the same direction as the current flowing through conductor 50, as shown by arrows 53, the magnetic field created by conductor 50 acts to draw liquid metal in channel 52 through orifice 20 to form droplet 24 or even a stream of liquid metal. Electrodes 54, 55, 56, and 57 couple a power supply to conductor 50 and the liquid metal.

Figure 4:
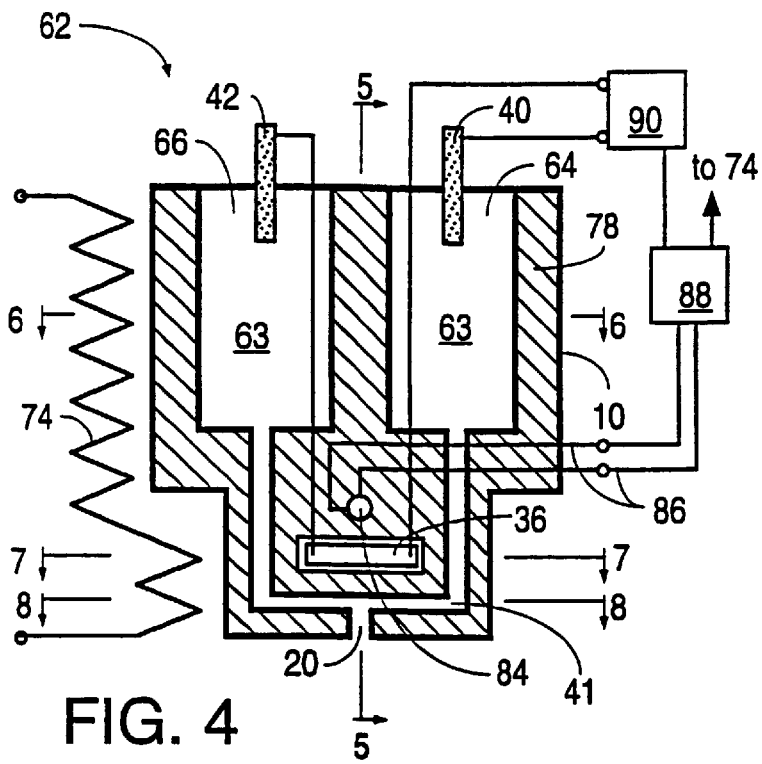
FIG. 4 is a cross-sectional view of a drop generator using the drop ejector portion of FIG. 2.

FIG. 4 is a cross-sectional view of a solder drop ejector 62 which employs the method described with respect to FIG. 2 to eject a drop or a stream of liquid metal.

Solder drop ejector 62 contains, in one embodiment, a tin-lead solder 63 or other metal or metal alloy in a heated liquid state. A dielectric first chamber 64 and a dielectric second chamber 66 both contain a supply of heated solder 63. A channel 41 runs between chambers 64 and 66 and communicates with an orifice 20 through wall 10 of solder drop ejector 62. Channel 41, in one embodiment, has a diameter of approximately 1 mm; however, the diameter may be any suitable size depending on various factors such as the particular application for the drop ejector, the currents needed to be generated, the construction of the drop ejector, and the physical properties of the liquid metal.

A heater 74 is provided proximate to chambers 64 and 66 to maintain the solder 63 in a liquid state. Heater 74 may be a resistive heater, or any other suitable type of heater. A heat conducting material 78, such as metal electrically insulated from the current carrying components or a ceramic, conducts heat from heater 74 to solder 63 within chambers 64 and 66 and in channel 41.

A conductor 36, similar to that described with respect to FIG. 2, is insulated from the solder 63 in chambers 64 and 66 and in channel 41 by any means, such as a dielectric layer or sleeve surrounding conductor 36. Conductor 36 may be a copper wire or metal sheet. In one embodiment, conductor 36 has a cross-section of 1.5 $mm^2 \times 0.2$ $mm^2$.

A thermocouple 84 is positioned so as to sense the approximate temperature of solder 63 and has leads 86 extending therefrom. Thermocouple 84 can be any suitable temperature transducer which generates an electrical signal representing the temperature of solder 63. The signal on leads 86 is then coupled to a temperature regulator circuit 88 which converts the signal to a control signal for controlling heater 74 to keep the temperature of the liquid solder 63 at a relatively constant temperature to maintain the desired surface tension and viscosity of solder 63. Such temperature regulators are commercially available. The temperature signal may also be used to control a pulse current source 90 to modify the magnitude of current as appropriate to maintain a constant size droplet of solder being ejected from orifice 20, assuming the temperature of solder 63 affects the droplet size emitted from orifice 20.

Conductive electrodes 40 and 42, preferably formed of a metal which is wettable but relatively insoluble in solder, such as nickel or iron, are inserted into chambers 64 and 66 to contact the conductive liquid solder 63.

A current path is created between a first lead 94 of pulse current source 90, through electrode 40, through solder 63 flowing in channel 41, through electrode 42, through conductor 36, and to a second terminal 96 of pulse current source 90. The current flowing through conductor 36 will be in a direction opposite to the current flowing through solder 63 in channel 41 directly beneath conductor 36 such that the magnetic repulsion provided by the current through conductor 36 forces a droplet or a stream of liquid solder through orifice 20.

The particular form of the solder drop ejector is a matter of design choice and all suitable forms are contemplated by this invention.

The structure of FIG. 4 can easily be modified to form conductor 36 along the bottom wall of drop ejector 62, similar to the structure of FIG. 3, and cause current through the fixed conductor and current through the solder 63 in channel 41 to flow in the same direction.

In one embodiment, solder chambers 64 and 66 are open to the atmosphere at the top and, when operated in a vertical orientation, the pressure at orifice 20 is a positive pressure of several centimeters of a liquid solder column equivalent to several tens of centimeters of a water column. In one embodiment, the amount of solder 63 in chambers 64 or 66 is on the order of a few milliliters, such as one to 25 milliliters.

The function of the solder drop ejector 62 may be accomplished, however, with chamber capacities of virtually any size from 0.1 milliliters to 100 milliliters or greater.

The supply of solder may also be obtained from an external reservoir with solder being drawn into the drop ejector by capillary or siphon action. The use of a pump, either mechanical or operating on a magnetohydrodynamic principle, to supply the solder is also contemplated.

In the preferred embodiment, the solder drop ejector 62 (or any solder drop ejector described herein) is self-contained as a single replaceable unit and may be in the form of a cartridge which is disposable or refillable after the initial supply of solder has been depleted. The cartridge is easily removed from or inserted into a receptacle, similar to an inkjet print cartridge in a printer. The simplicity of the invention greatly reduces the cost and size of the drop ejector, making it now feasible to form the drop ejector as a self-contained disposable unit. Heater 74 may or may not be part of the disposable unit depending on cost and other feasibility considerations.

Figure 5:
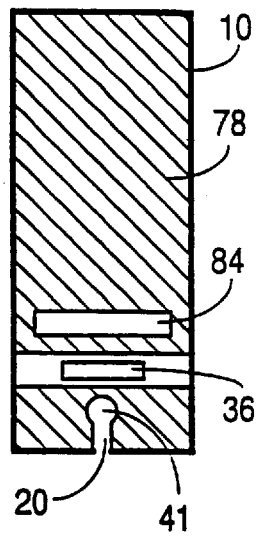
FIG. 5 is a cross-section of the device of FIG. 4 taken along line 5—5 in FIG. 4.

FIG. 5 is a cross-sectional view of the structure of FIG. 4 along line 5—5 in FIG. 4. Elements which are identified with identical numerals have identical functions, and a description of these elements will not be repeated.

Figure 6:
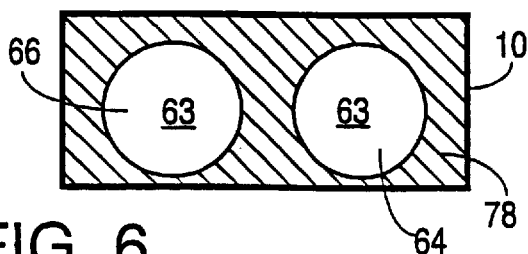
FIG. 6 is a cross-section of the device of FIG. 4 taken along line 6—6 in FIG. 4.
Figure 7:
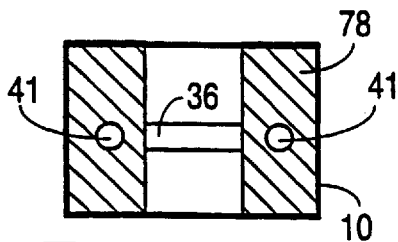
FIG. 7 is a cross-section of the device of FIG. 4 taken along line 7—7 in FIG. 4.
Figure 8:
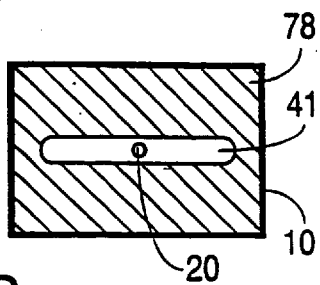
FIG. 8 is a cross-section of the device of FIG. 4 taken along line 8—8 in FIG. 4.

FIG. 6 is a cross-sectional view of the structure of FIG. 4 along line 6—6. FIG. 7 is a cross-sectional view of the structure of FIG. 4 along line 7—7, and FIG. 8 is a cross-sectional view of the structure of FIG. 4 along line 8—8.

Figure 9:
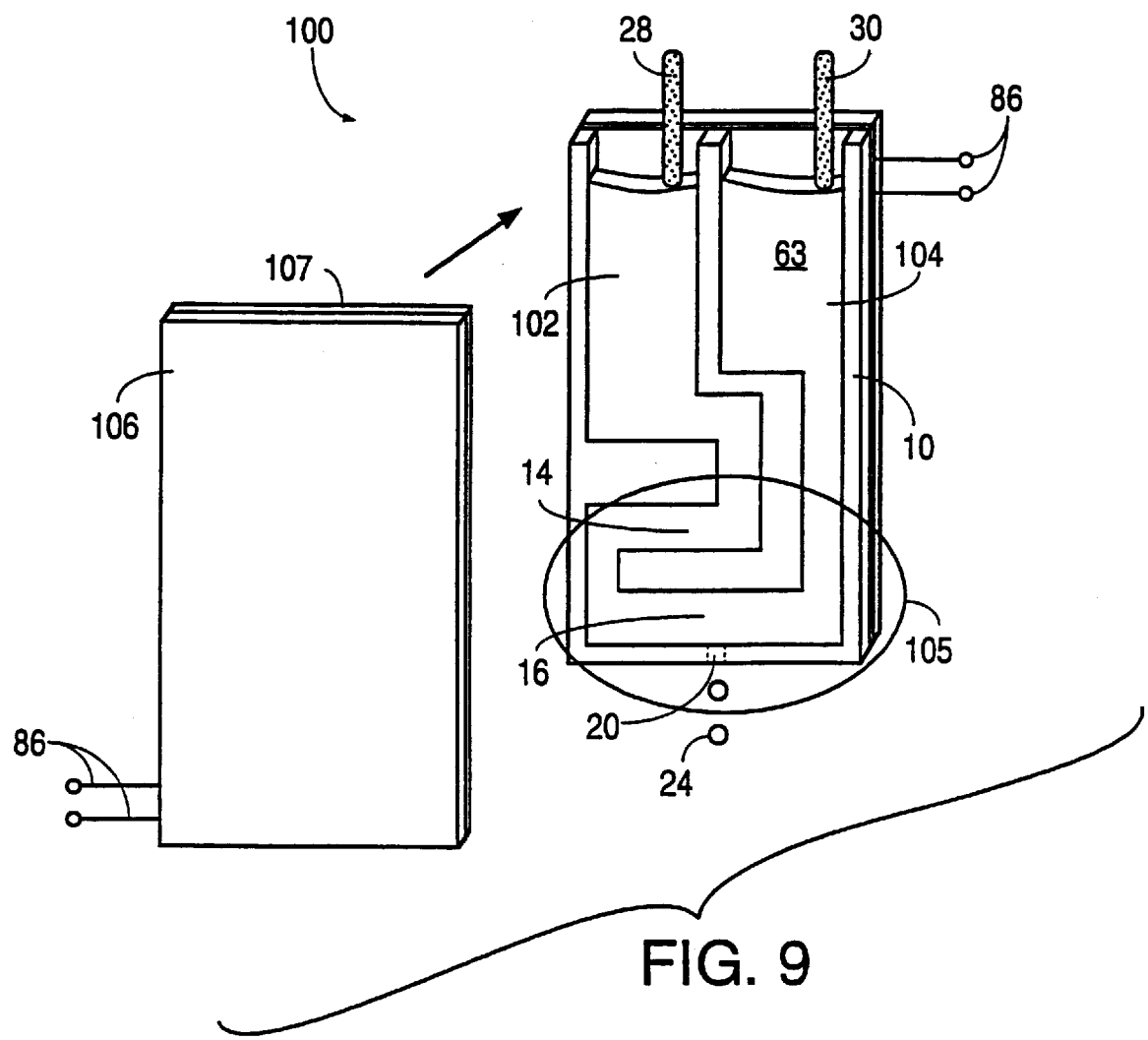
FIG. 9 is a front perspective of a drop generator using the drop ejector portion of FIG. 1.

FIG. 9 is a front perspective view of another embodiment solder drop ejector 100, having its front panel removed, which uses the principles described with respect to FIG. 1. Chambers 102 and 104, having side chamber walls 10, contain an amount of liquid solder 63 and have a back channel portion 14 and a front channel portion 16 connecting them. Wall 18 insulates chambers 102 and 104 and channels 14 and 16, forming the folded current path through channels 14 and 16. Channel 16 communicates with an orifice 20 (obscured by solder 63 but shown by dashed lines). The outlined portion 105 may be identical to that shown in FIG. 1.

Electrodes 28 and 30 are sufficiently inserted into chambers 102 and 104 to provide continuous contact with solder 63 even as solder 63 becomes progressively depleted.

A heat spreader 106 forms opposing panels of drop ejector 100. Heat spreader 106 may be a copper plate. The inside wall 107 of each panel may be formed of a ceramic material assembled with glaze. It is desirable for the inside wall 107 to be wettable by the liquid solder to make drop ejector 100 easier to prime. Thermocouple leads 86 extend from each panel and are connected to a controller circuit for controlling the heater and, potentially, modulating a pulse current source connected to electrodes 28 and 30. Since the drop ejector principle of the present invention requires no magnetic materials, drop ejector 100 may be operated at high temperatures, for example above 1000° C., which are above the Curie Points of magnetic materials.

As described with respect to FIG. 1, a pulse of electric current from a pulse current source (such as source 90 in FIG. 4) is applied to electrodes 28 and 30 as to cause a repulsion of the solder 63 in front channel portion 16 to eject a drop 24 of solder from orifice 20.

Figure 10:
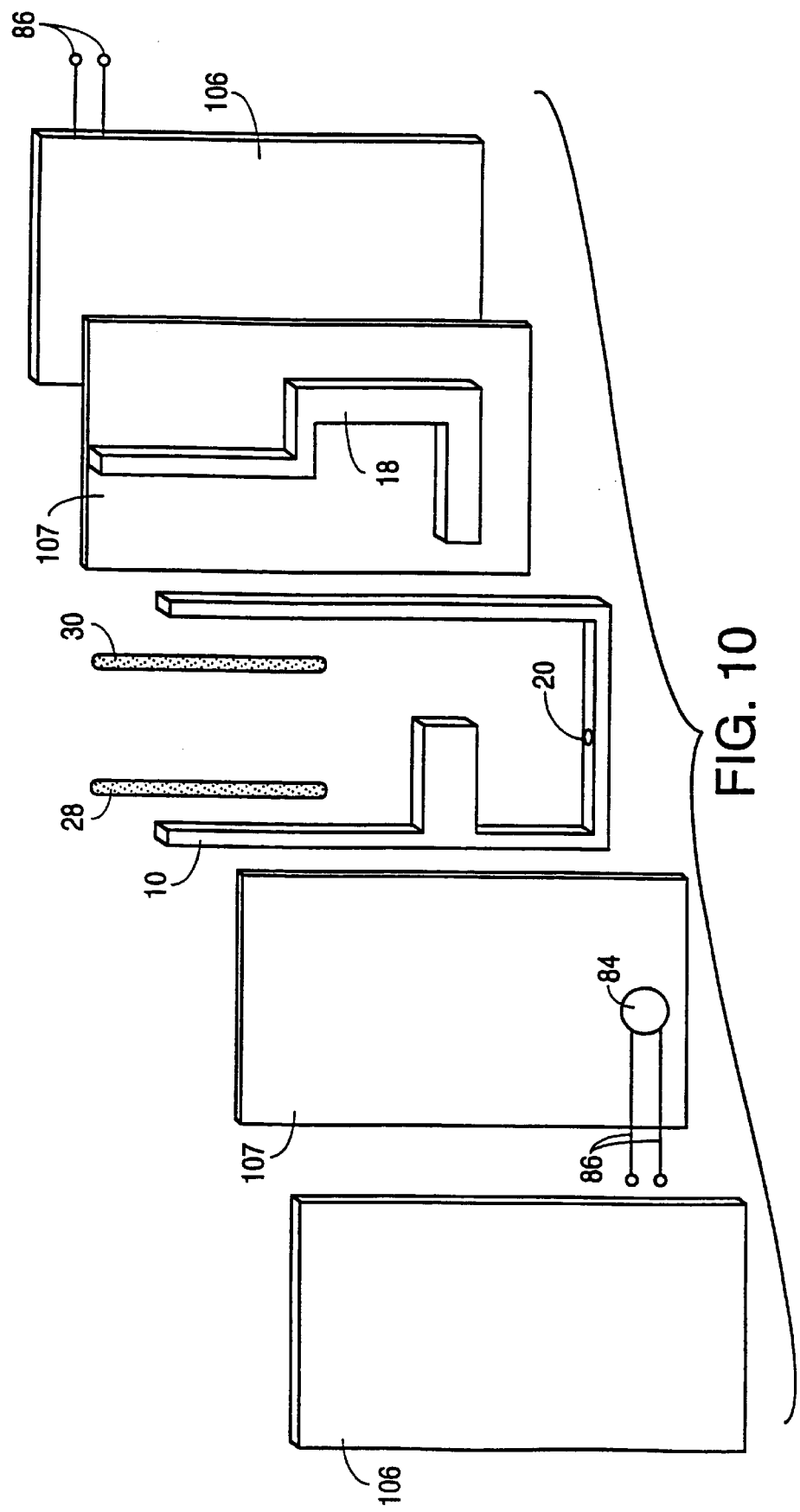
FIG. 10 is an exploded view of the device of FIG. 9.

In the preferred embodiment, drop ejector 100 of 5 FIGS. 9 and 10 is a replaceable cartridge.

FIG. 10 is an exploded view of the structure of FIG. 9 showing heat spreader 106, inside wall 107, thermocouple 84, side chamber walls 10, orifice 20, separating wall 18, and electrodes 28 and 30.

The orifice 20 size is selected to produce a droplet size typically within the range of 50–200 microns in diameter. Such an orifice 20 size will be between approximately 50–100 microns in diameter. A typical channel may be approximately 10 mm–20 mm long by 0.25 mm–1 mm wide. The pulsed current will typically be on the order of 100–1000 amperes, although a current of 10 amperes or greater may be adequate depending on the particular drop ejector structure. The volume of the ejected droplet may be controlled to approximately ±25% by adjusting the width of the current pulse. Typical operating rates may be on the order of 100–1000 Hz.

As seen, a drop ejector operating on a magnetohydrodynamic principle has been described herein which does not require magnetic materials or magnetic coils. By not using magnetic materials or coils, the drop ejector may be made small and inexpensively and operated at very high temperatures.

Figure 11:
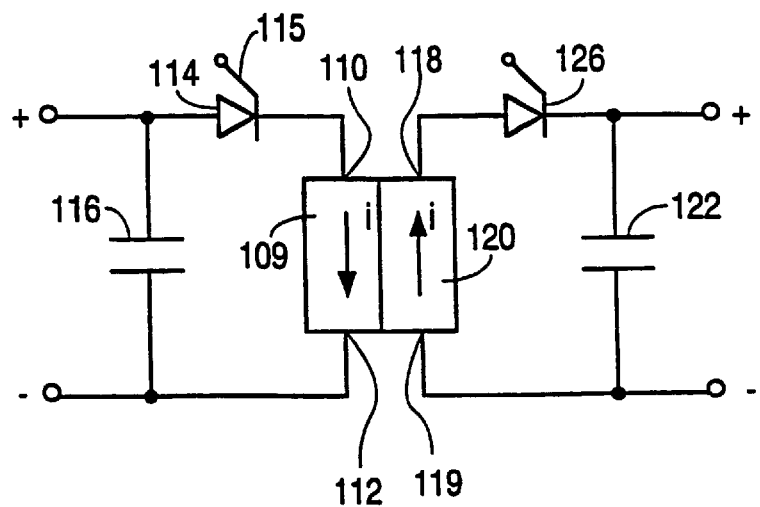
FIG. 11 is a schematic diagram of a circuit for delivering a pulse of current through the conductors in the drop generator.

FIG. 11 illustrates a circuit which may be used to generate a pulsed current through either a column of solder (load 109) or through the solder in conjunction with the solid conductor. Either one or both circuits shown may be used. In one embodiment, the two electrodes extending from the drop ejectors of FIGS. 4 and 9 are connected to nodes 110 and 112 of the circuit. A switch, such as a silicon controlled rectifier 114, receives a control pulse on lead 115 which couples the charge in capacitor 116 across nodes 110 and 112 to generate a pulse of current through the solder (load 109) to eject a droplet of solder. Rectifier 114 then automatically becomes nonconductive, and capacitor 116 again charges in preparation for the next pulse. In one embodiment, the charging voltage is 1–230 volts, the capacitor 116 value is 50 microfarads or greater, the discharge time is around 20–50 microseconds, and the energy per pulse is approximately 0.2–2 Joules.

Other suitable circuits are easily designed depending on the requirements of the drop ejector. A suitable control circuit may also be used to vary the duration and magnitude of the current pulse to adjust the drop size.

The drop ejector embodiments of FIGS. 2 and 3, using a fixed conductor, may use both pulse current sources shown in FIG. 11. In such a case, nodes 110 and 112 would be connected to the solder path (load 109) and nodes 118 and 119 would be connected to the fixed conductor (load 120). A control pulse would be commonly applied to rectifiers 114 and 126. Capacitors 116 and 122 may have the same value or different values for delivering the desired current pulse.

Figure 12:
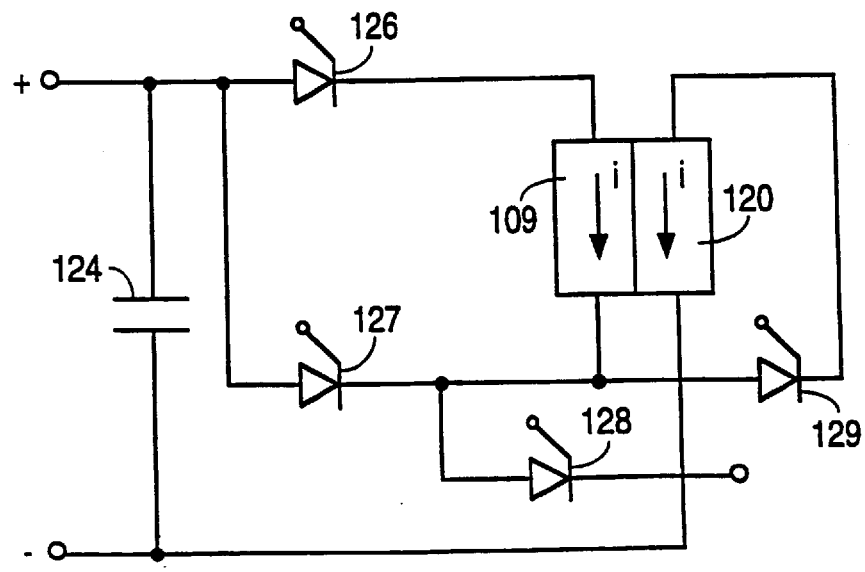
FIG. 12 is a schematic diagram of another circuit for providing pulsed current through the conductors in the drop generator.

FIG. 12 is another schematic diagram of a circuit for delivering synchronized pulses of current to the drop ejector, but uses a single capacitor 124. Rectifiers 126 and 128 may be simultaneously activated to pulse a current only through load 109 (which may be the solder column of FIG. 1 or the fixed conductor and solder column in FIG. 2), or rectifiers 126 and 129 may be simultaneously activated to pulse a current through loads 109 and 120 in the manner shown in FIG. 3. Activating rectifiers 127 and 128 in this arrangement shunts capacitor 124 to ground, resetting rectifiers 126 and 129.

In other embodiments, a pulsed current source for use with the solder drop ejector produces a rectangular pulse at a high amperage lasting 30–50 microseconds.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the scope of this invention.

Industrial Applicability

This simple yet highly reliable technique for ejecting a droplet of heated solder, or other liquid conductive material (even non-metals) enables a device for providing controlled sizes of liquid metal drops which are used to create both electrical connections as well as mechanical connections between two pieces.

What is claimed is:

1. A method for producing a stream or droplet of liquid conductive material comprising the steps of:
   providing said liquid conductive material in a first channel in fluid communication with an orifice;
   supplying an electric current through said liquid conductive material in said first channel;
   supplying an electric current through a conductor proximate to said first channel such that the interaction of magnetic forces generated by said current through said conductor and said current through said liquid conductive material in said first channel forces an amount of said liquid conductive material through said orifices,
   wherein said step of supplying an electric current through said conductor comprises supplying a current through said liquid conductive material in a second channel in fluid communication with said first channel.

2. The method of claim 1 wherein said second channel is substantially parallel to said first channel.

3. The method of claim 1 wherein said step of supplying an electric current through said conductor comprises supplying a current through a solid conductor.

4. The method of claim 3 wherein said solid conductor is substantially parallel to said first channel.

5. The method of claim 1 wherein said first channel is located between said orifice and said conductor.

6. The method of claim 1 wherein said orifice is located between said conductor and said first channel.

7. The method of claim 1 further comprising the step of providing a heater proximate to said first channel to maintain said liquid conductive material in a molten state.

8. The method of claim 1 further comprising the step of providing a receptacle for an amount of said liquid conductive material in fluid communication with said first channel, said receptacle having a capacity of between approximately 0.1–25 milliliters.

9. The method of claim 1 wherein said liquid conductive material is selected from the group consisting of metals and metal alloys.

10. A method for producing a stream or droplet of liquid conductive material comprising the steps of:
    providing said liquid conductive material in a first channel in fluid communication with an orifice;
    supplying an electric current through said liquid conductive material in said first channel;
    supplying an electric current through a conductor proximate to said first channel such that the interaction of magnetic forces generated by said current through said conductor and said current through said liquid conductive material in said first channel forces an amount of said liquid conductive material through said orifice,
    wherein said conductor comprises said liquid conductive material in a second channel in fluid communication with said first channel.

11. The method of claim 9 further comprising the steps of:
    providing a first electrode in said first channel and a second electrode in said second channel; and
    applying a current between said first electrode and said second electrode to eject a droplet of said liquid conductive material through said orifice.

12. The method of claim 1 wherein said conductor is substantially parallel to said first channel and runs along a side of said first channel opposite to a side of said first channel containing said orifice, wherein said current through said conductor is in a direction opposite to said current through said liquid conductive material in said first channel.

13. The method of claim 1 wherein said conductor is substantially parallel to said first channel and runs along the same side of said first channel which contains said orifice, wherein said current through said conductor is in the same direction as the direction of said current through said liquid conductive material in said first channel.

14. The method of claim 1 wherein said step of providing said liquid conductive material in said first channel further comprises the step of providing a supply of said liquid conductive material in a first chamber in fluid communication with said first channel.

15. The method of claim 14 wherein said chamber has a capacity of less than approximately 25 milliliters.

16. The method of claim 1 wherein said orifice is between approximately 50–200 microns in diameter.

17. The method of claim 1 wherein said step of supplying a current through said conductor and through said liquid conductive material comprises the step of supplying one or more pulses of electric current to said conductor and to said liquid conductive material in said first channel between approximately 10–1000 amperes.

18. The method of claim 1 wherein said step of providing said liquid conductive material in said first channel comprises the step of inserting a replaceable cartridge, containing said liquid conductive material in said first channel, into a receptacle.

19. A drop ejector comprising:
    a supply of liquid conductive material in a first channel, said first channel having an orifice;

at least one first electrode contacting said liquid conductive material in said first channel to conduct an electric current flowing through said liquid conductive material in said first channel;

a conductor situated substantially parallel to said first channel and proximate to said first channel; and at least one second electrode connected to said conductor to conduct an electric current flowing through said conductor, said conductor, said first channel, and said orifice being arranged such that a sufficient electric current through said conductor and said liquid conductive material in said first channel generates magnetic fields interacting with said electric current which force an amount of said liquid conductive material through said orifices, wherein said conductor comprises said liquid conductive material in a second channel in fluid communication with said first channel.

20. The ejector of claim 19 wherein said conductor comprises a solid conductor.

21. The ejector of claim 19 wherein said first channel is located between said orifice and said conductor.

22. The ejector of claim 19 wherein said orifice is located between said conductor and said first channel.

23. The ejector of claim 19 further comprising a heater proximate to said first channel to maintain said liquid conductive material in a molten state.

24. The ejector of said claim 19 wherein said ejector is formed as a replaceable cartridge.

25. The ejector of claim 19 further comprising a receptacle for an amount of said liquid conductive material in fluid communication with said first channel, said receptacle having a capacity of between approximately 0.1–25 milliliters.

* * * * *